(12) United States Patent
Ma et al.

(10) Patent No.: US 11,129,394 B2
(45) Date of Patent: Sep. 28, 2021

(54) TEA-BRUISING MACHINE AND METHOD OF BRUISING TEA

(71) Applicant: Tea Research Institute, Guangdong Academy Of Agricultural Sciences, Guangdong (CN)

(72) Inventors: Chengying Ma, Guangdong (CN); Aiqing Miao, Guangdong (CN); Wei Chen, Guangdong (CN); Junxi Cao, Guangdong (CN); Bin Zeng, Guangdong (CN); Shi Pang, Guangdong (CN); Dandan Qi, Guangdong (CN)

(73) Assignee: Tea Research Institute, Guangdong Academy Of Agricultural Sciences

( * ) Notice: Subject to any disclaimer, the term of this patent is extended or adjusted under 35 U.S.C. 154(b) by 383 days.

(21) Appl. No.: 16/331,802

(22) PCT Filed: Aug. 10, 2017

(86) PCT No.: PCT/CN2017/096700
§ 371 (c)(1),
(2) Date: Mar. 8, 2019

(87) PCT Pub. No.: WO2018/232883
PCT Pub. Date: Dec. 27, 2018

(65) Prior Publication Data
US 2019/0200635 A1 Jul. 4, 2019

(30) Foreign Application Priority Data
Jun. 22, 2017 (CN) .......................... 201710481334.9

(51) Int. Cl.
*A23F 3/12* (2006.01)
*A23F 3/14* (2006.01)
(Continued)

(52) U.S. Cl.
CPC ................. *A23F 3/12* (2013.01); *A23F 3/06* (2013.01); *A23F 3/08* (2013.01); *A23F 3/14* (2013.01);
(Continued)

(58) Field of Classification Search
CPC ...... A23F 3/06; A23F 3/08; A23F 3/12; A23F 3/14; A23V 2002/00; A23V 2250/214
See application file for complete search history.

(56) References Cited

FOREIGN PATENT DOCUMENTS

| CN | 201332664 Y | 10/2009 |
|---|---|---|
| CN | 204377804 U | 6/2015 |

(Continued)

OTHER PUBLICATIONS

First Search Report of CN201710481334.9 filed Jun. 22, 2017.
(Continued)

*Primary Examiner* — Anthony J Weier
(74) *Attorney, Agent, or Firm* — Lerner, David, Littenberg, Krumholz & Mentlik, LLP

(57) ABSTRACT

A leaf bruising machine and method for tea inluding frame, bruising basket, rotating door, locking assembly, and drive control mechanism. Bruising basket is rotatably disposed on frame, and has feed, discharge opening, and accommodating cavity. Rotating door is arranged at bruising basket outer side. Position limiting hole is provided on rotating door. Bruising basket rotates relative to rotating door. Rotating door blocks or opens feed and discharge opening. Locking assembly having spring-loaded ball latch and electromagnetic switch. Drive control mechanism comprises rotation drive device and controller. Rotation drive device is connected to bruising basket to drive bruising basket rotation. Leaf bruising machine bruises tea leaves. When feed and discharge opening is opened or sealed, bruising basket and rotating door is locked by electromagnetic switch and (Continued)

spring-loaded ball latch cooperation. Automated opening and closing of rotating door, and feeding, discharging, and bruising process control is enabled to improve efficiency.

10 Claims, 7 Drawing Sheets

(51) Int. Cl.
*A23F 3/08* (2006.01)
*A23F 3/06* (2006.01)

(52) U.S. Cl.
CPC ..... *A23V 2002/00* (2013.01); *A23V 2250/214* (2013.01)

(56) References Cited

FOREIGN PATENT DOCUMENTS

| CN | 105126731 | A | 12/2015 |
|----|-----------|---|---------|
| CN | 204888598 | U | 12/2015 |
| CN | 105767278 | A | 7/2016 |
| CN | 205512078 | U | 8/2016 |
| CN | 106665899 | A | 5/2017 |
| CN | 206227534 | U | 6/2017 |
| GB | 650323 | * | 2/1951 |
| JP | H0884559 | A | 4/1996 |
| TW | 205695417 | U | 4/2019 |

OTHER PUBLICATIONS

First Office Action of CN201710481334.9 filed Jun. 22, 2017.
First Office Action and Search Report of TW106129457, dated Apr. 10, 2019.

International Search Report PCT/CN2017/096700, dated Mar. 23, 2018.

* cited by examiner

TEA-BRUISING MACHINE AND METHOD OF BRUISING TEA

CROSS REFERENCE TO RELATED APPLICATIONS

The present application is a national phase entry under 35 U.S.C. § 371 of International Application No. PCT/CN2017/096700, filed Aug. 10, 2017, which claims priority from Chinese Patent Application No. 201710481334.9 filed Jun. 22, 2017, all of which are hereby incorporated herein by reference.

TECHNICAL FIELD

The present disclosure relates to the field of tea manufacture equipment, particularly to a tea-bruising machine and a method of bruising tea.

BACKGROUND

Tea bruising, a light disruption process in oolong tea manufacture (also known as "Yao Qing" in Chinese), is the most critical step for the taste and aroma formation of oolong tea, and tea-bruising machines are important for the mechanization of oolong tea processing.

At present, there are two main types of oolong tea bruising machines: the vibration-bruising type machines and the rolling-bruising type machines. The vibration bruising machines are divided into the single-screen vibration type and the trough vibration type. The single-screen vibration bruising machines suffer from low bruising efficiency and labor reliance in loading and unloading tea leaves, and, thus, are incompatible with oolong tea production lines for continuous production. Although the trough vibration type bruising machines can be applied to continuous tea processing, they also suffer from low bruising efficiency, that is to say long bruising duration is required to guarantee sufficient degree of leaf disruption, and loud operation noises. The rolling-bruising type machines are divided into continuity-rolling type and batch-rolling type. The continuity-rolling type bruising machines can be applied to continuous production, but their bruising duration is uncontrollable. As the batch-rolling type bruising machines can produce oolong tea with optimum quality, they are currently the most widely used ones in practical tea production.

However, the batch-rolling type bruising machines rely on manual assistance in operation, especially in opening and closing tossing cage for loading and unloading tea leaves, which makes it impossible to be applied as a part of continuous oolong tea production line or automatic tea-bruising module.

SUMMARY

Based on this, it is necessary to provide a tea-bruising machine which can open and close the tossing cage automatically for loading and unloading tea leaves, and a method of bruising tea.

A tea-bruising machine comprising a rack, a tossing cage, a rotating door, a locking assembly and a drive and control mechanism;

the rotatable tossing cage is disposed on the rack, and the tossing cage has an inlet and outlet port and a receiving chamber connected with the inlet and outlet port;

the rotating door is disposed on the outside of the tossing cage, and the rotating door is provided with a limiting hole, and the tossing cage can rotate relative to the rotating door to seal the rotating door or open the inlet and outlet port;

the locking assembly comprises an elastic bead lock and an electromagnetic switch, the elastic bead lock comprises an elastic lock body and a bead body which are disposed on the tossing cage and the rotating door respectively and coordinate with each other for locking the tossing cage with the rotating door, and the electromagnetic switch has a locking column for inserting into the limiting hole;

the drive and control mechanism comprises a rotation driving device and a controller, the rotation driving device is connected with the tossing cage for driving the tossing cage to rotate, and the controller is electrically connected with the rotation driving device and the electromagnetic switch, respectively;

the controller is capable of controlling insertion of the locking column of the electromagnetic switch into the limiting hole, and of controlling the rotation driving device to drive the tossing cage to rotate in different directions to lock or unlock the tossing cage with the rotating door; after the tossing cage is locked with the rotating door, the controller is capable of controlling the locking column to release from the limiting hole, and of controlling the rotation driving device to drive the tossing cage to rotate with the rotating door together.

In one embodiment, the tossing cage comprises a cylindrical cage wall and two end covers, and the two end covers are respectively disposed at two ends of the cylindrical cage wall and seal the cylindrical cage wall; and the inlet and outlet port is opened on the cylindrical cage wall.

In one embodiment, the elastic bead lock has at least two groups, wherein the first group of elastic bead lock comprises a first elastic lock body and a first bead body, and the second group of elastic bead lock comprises a second elastic lock body and a second bead body;

the first elastic lock body is disposed on the cylindrical cage wall and located at an edge position of the side in contact with the rotating door, and the second elastic lock body is disposed on the cylindrical cage wall and located at a middle position of the cylindrical cage wall, and the first bead body and the second bead body are disposed at edge positions of both sides of the rotating door, respectively;

when the first elastic lock body and the first bead body are locked, the tossing cage and the rotating door coordinate with each other to seal the inlet and outlet port for bruising;

when the second elastic lock body and the second bead body are locked, the tossing cage and the rotating door coordinate with each other to expose the inlet and outlet port for loading and unloading materials.

In one embodiment, the tossing cage is provided with an annular track;

the drive and control mechanism further comprises a driving wheel and an auxiliary wheel, the driving wheel can be driven to rotate by the rotation driving device, and the driving wheel and the auxiliary wheel are movably disposed on the rack;

the annular track rotates in coordination with the driving wheel and the auxiliary wheel so that the tossing cage can be driven to rotate by the rotation driving device.

In one embodiment, the drive and control mechanism further comprises a first transmission rod and a second transmission rod;

the first transmission rod is connected with the rotation driving device, and the first transmission rod and the second transmission rod are movably mounted on the rack, respectively;

a plurality of the driving wheels are provided, which are disposed in series on the first transmission rod to form a driving wheel set; and a plurality of the auxiliary wheels are provided, which are disposed in series on the second transmission rod to form an auxiliary wheel set;

a plurality of the annular tracks are provided, which respectively rotate in coordination with the driving wheel set and the auxiliary wheel set to enable the tossing cage to be driven to rotate by the rotation driving device.

In one embodiment, the rack is provided with a plurality of supporting plates, and the first transmission rod and the second transmission rod are passed through the plurality of supporting plates, respectively.

In one embodiment, the annular track is provided at intervals with a plurality of blocking columns which are located on the outside of the rotating door for movably clamping the rotating door between the tossing cage and the blocking columns.

In one embodiment, the electromagnetic switch is disposed on the rack.

In one embodiment, the rack is provided with an universal wheel and a brake device at the bottom thereof.

A method of bruising tea using the above-mentioned tea-bruising machine comprising the following steps:

S1: controlling the locking column to be inserted into the limiting hole to limit the rotating door to prevent its movement, and controlling the rotation driving device to rotate and driving the tossing cage to rotate in the first hour hand direction to unlock the tossing cage and the first side of the rotating door, to expose the inlet and outlet port upwards, and rotating the tossing cage rotates to lock with the second side of the rotating door;

S2: loading tea raw materials;

S3: after the loading is finished, controlling the rotation driving device to rotate and drive the tossing cage to rotate in the second hour hand direction until the tossing cage are locked with the first side of the rotating door and the inlet and outlet port is sealed, controlling the locking column to release from the limiting hole, and controlling the rotation driving device to rotate and drive the tossing cage to rotate with the rotating door together to perform bruising;

S4: repeating step S1 after the bruising is finished, and then controlling the rotation driving device to rotate and drive the tossing cage to rotate with the rotating door together in the first hour hand direction until the inlet and outlet port faces downwards to perform unloading;

S5: after the unloading is finished, controlling the rotation driving device to rotate and drive the tossing cage to rotate with the rotating door together in the second hour hand direction until the inlet and outlet port faces upwards, controlling the locking column to be inserted into the limiting hole to limit the rotating door to prevent its movement, and controlling the rotation driving device to rotate and drive the tossing cage to rotate in the second hour hand direction until the tossing cage are locked with the first side of the rotating door and the inlet and outlet port is sealed.

The above-mentioned tea-bruising machine comprises a rack, a tossing cage, a rotating door, a locking assembly and a drive and control mechanism, wherein the rack is used for providing a supporting structure foundation, and the tossing cage has inlet and outlet port and receiving chambers for storing raw materials such as tea, and the rotating door is used to coordinate with the tossing cage to seal or open the inlet and outlet port; the elastic bead lock coordinates with the electromagnetic switch to lock or unlock the tossing cage with the rotating door; the drive and control mechanism comprises a controller and a rotation driving device, and the controller controls the rotation driving device and the electromagnetic switch. When the tea bruising is performed by using the above-mentioned tea-bruising machine, the electromagnetic switch can coordinate with the elastic bead lock under the control of the controller, thereby, the automatic opening and closing of the rotating door, and the automatic control of the process of the loading and unloading and the bruising can be realized, and the production efficiency can be improved. When the above-mentioned tea-bruising machine is linked with other processing equipment such as loading transport mechanism and receiving transport mechanism, the processing of raw materials such as tea as well as continuity and automation can be realized, and the production efficiency can be further significantly improved as a whole.

DETAILED DESCRIPTION OF EMBODIMENTS

Figure 1:
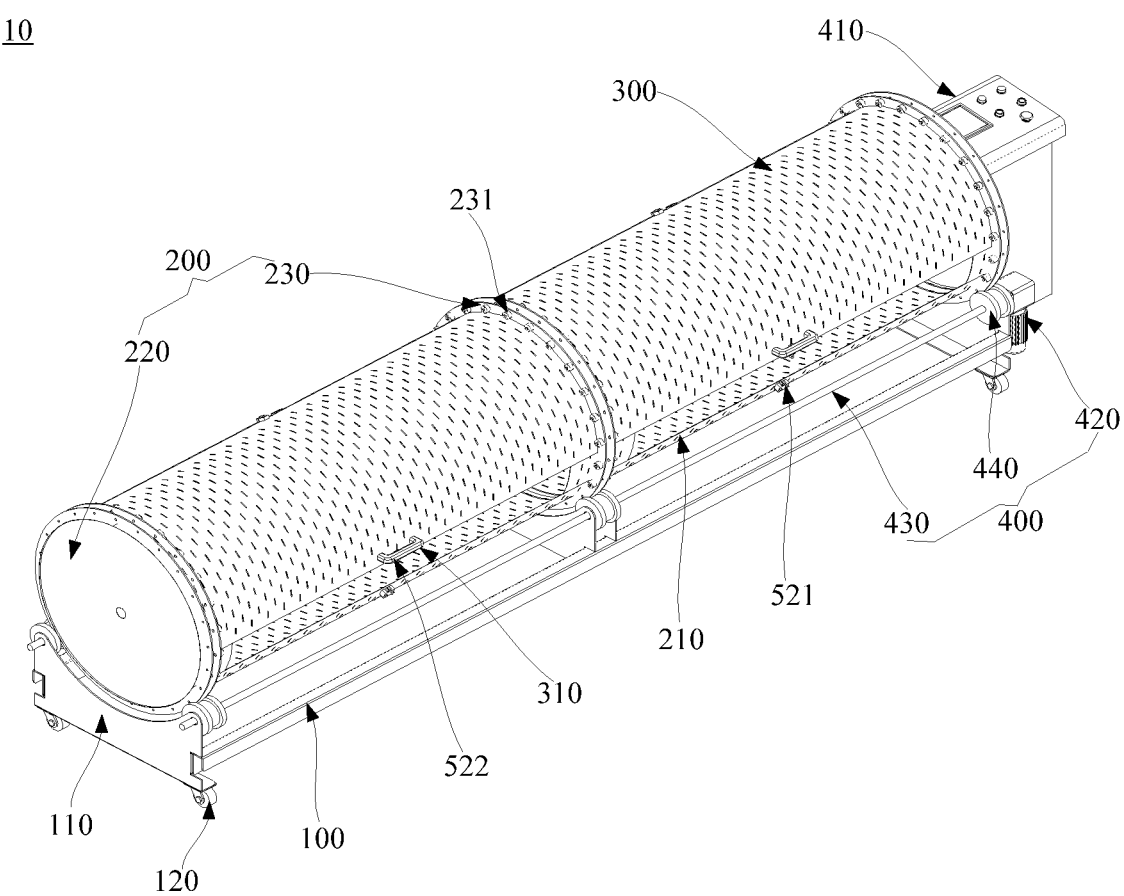
FIG. 1 is a structural schematic diagram of one view of the tea-bruising machine according to one embodiment.
Figure 2:
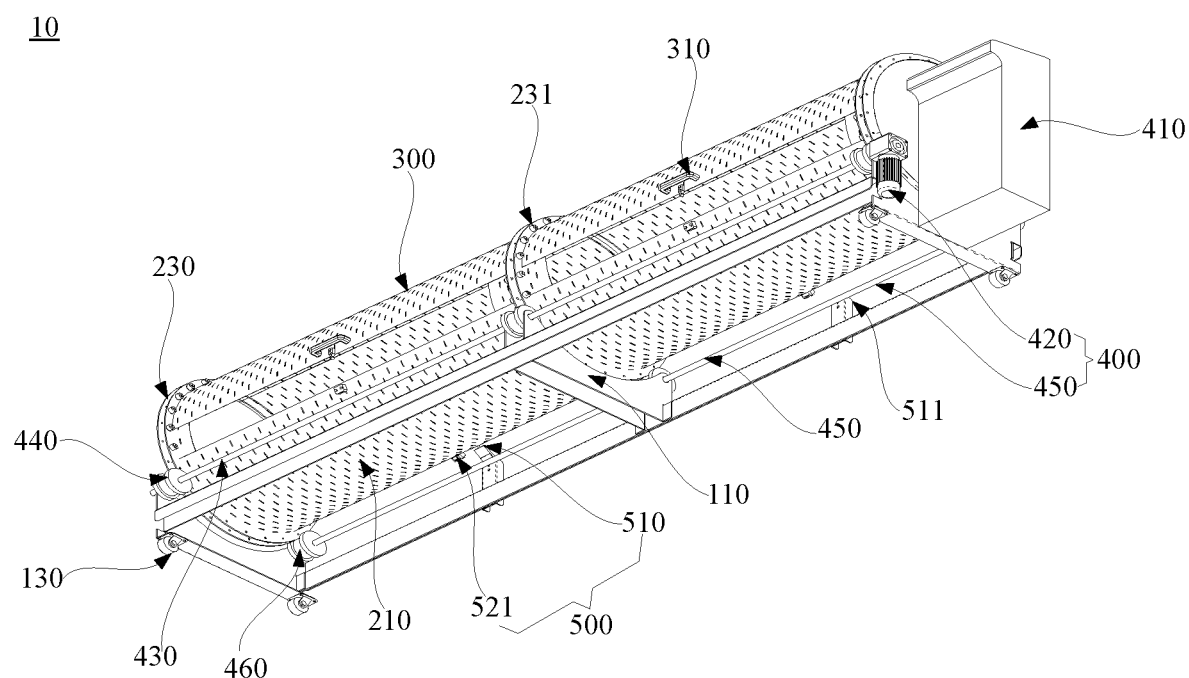
FIG. 2 is a structural schematic diagram of another view of the tea-bruising machine in FIG. 1.
Figure 3:
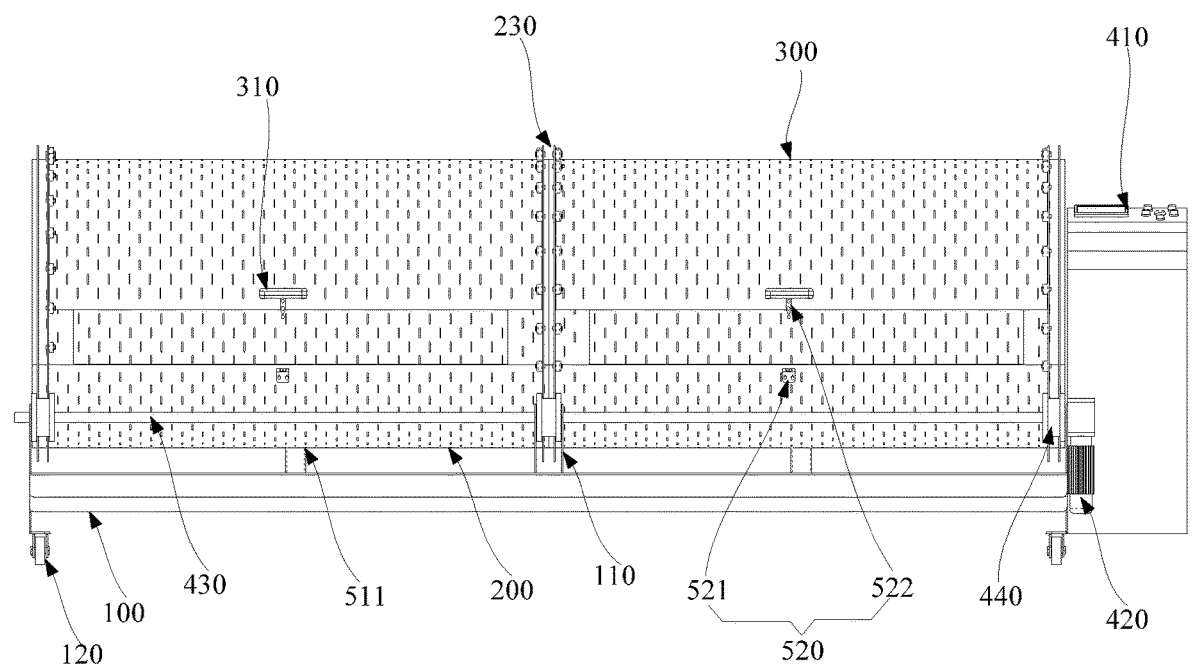
FIG. 3 is a structural schematic diagram of front view of the tea-bruising machine in FIG. 1.
Figure 4:
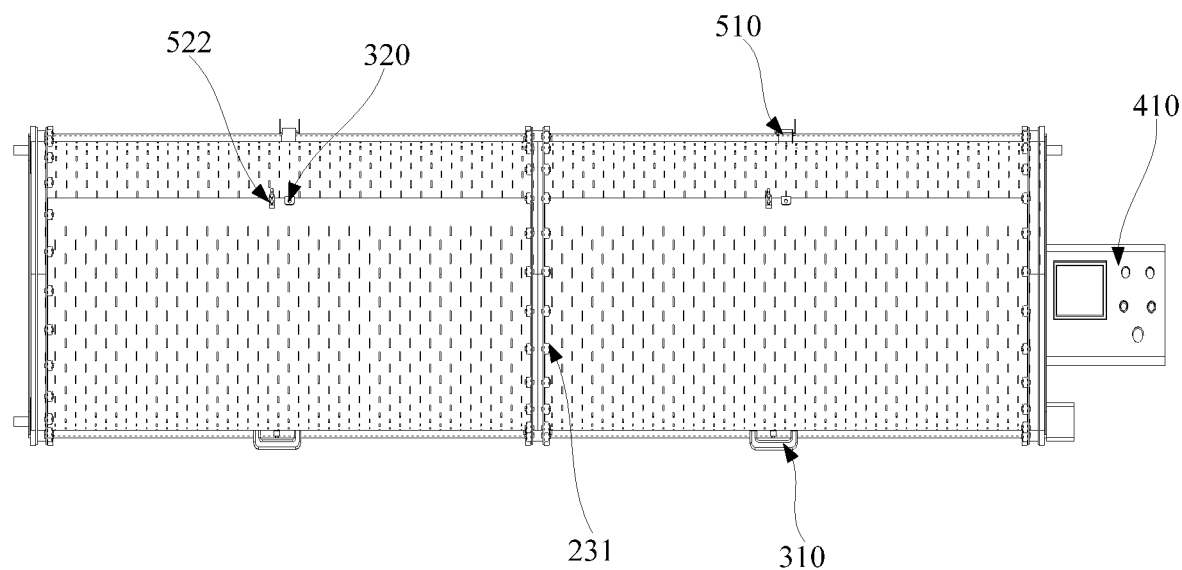
FIG. 4 is a structural schematic diagram of top view of the tea-bruising machine in FIG. 1.
Figure 5:
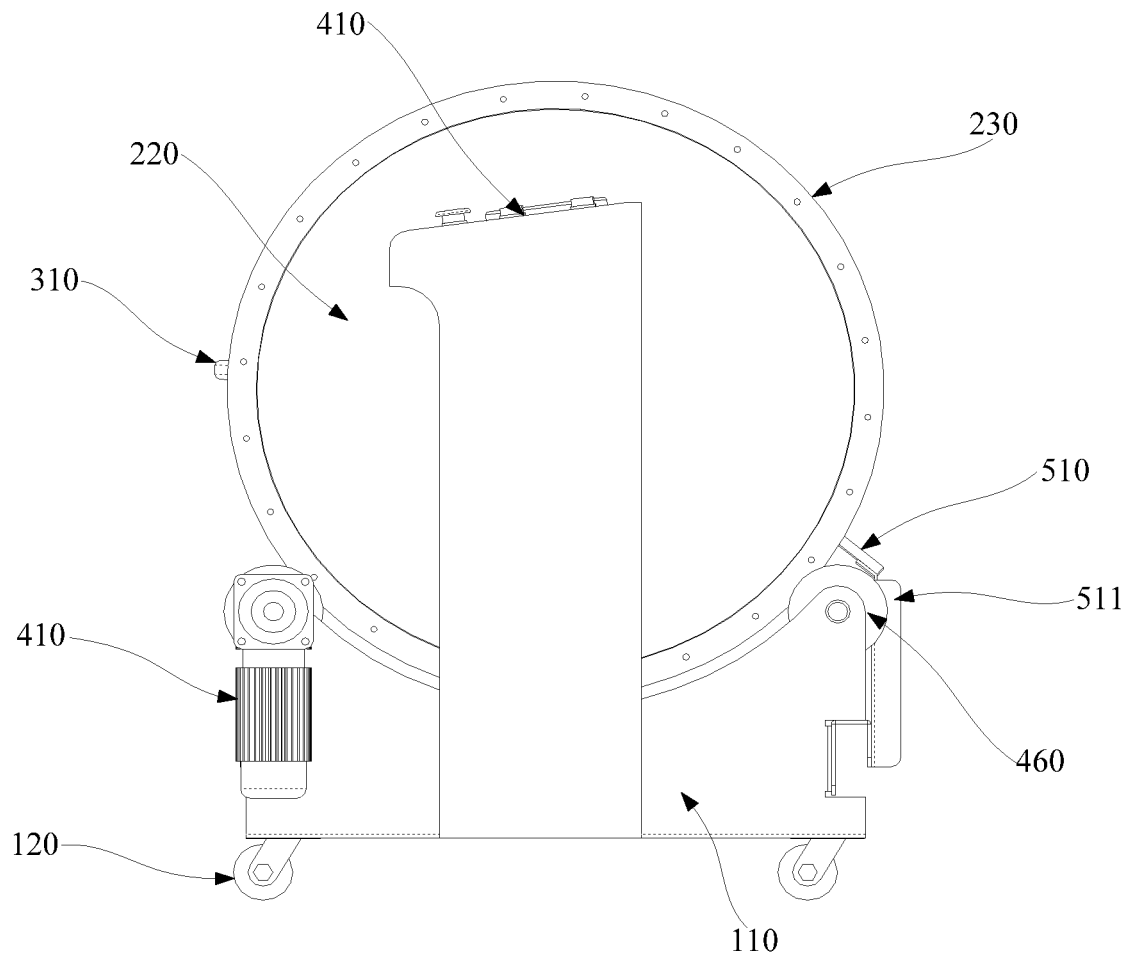
FIG. 5 is a structural schematic diagram of right view of the tea-bruising machine in FIG. 1.
Figure 6:
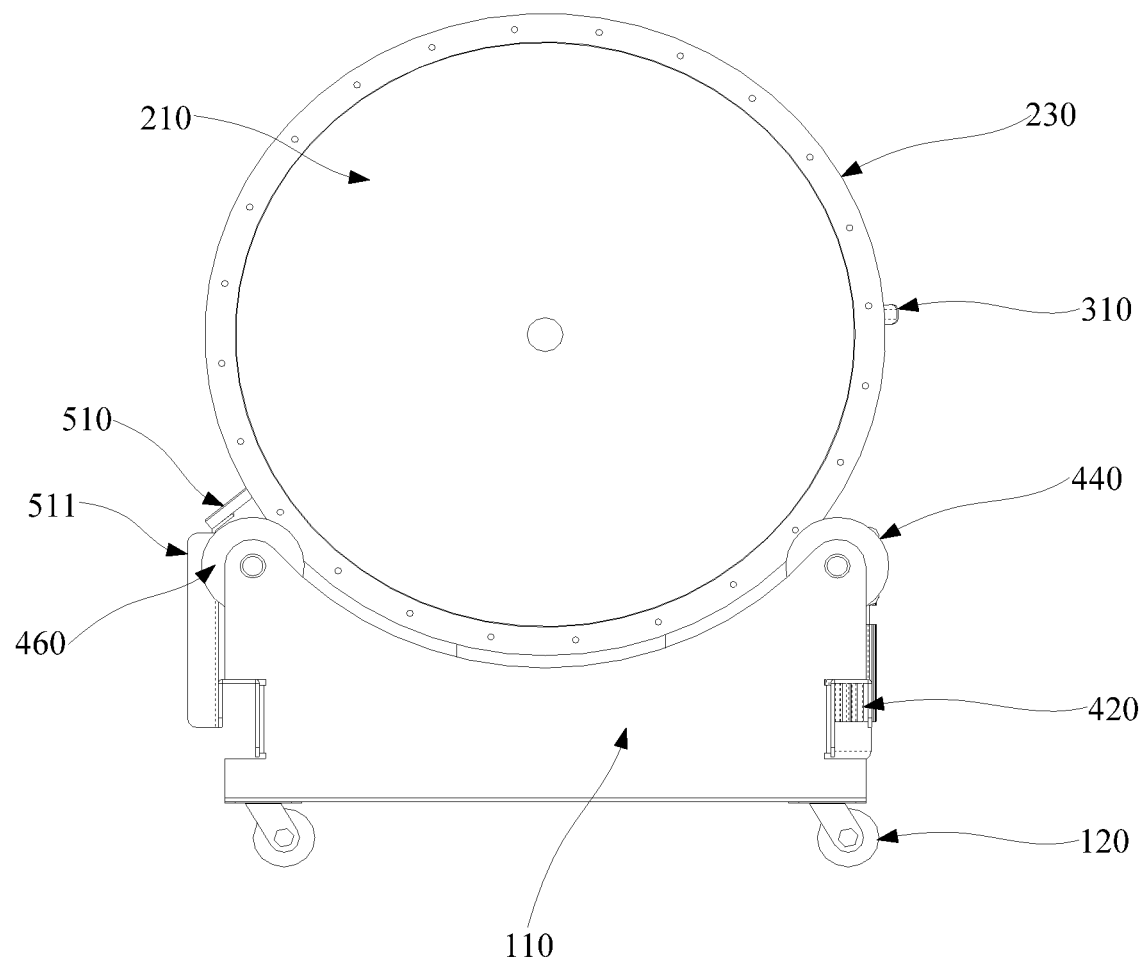
FIG. 6 is a structural schematic diagram of left view of the tea-bruising machine in FIG. 1.

For the convenience of understanding the present disclosure, embodiments of the disclosure are described more fully hereinafter with reference to the accompanying drawings. Preferable embodiments are presented in the drawings. However, the disclosure may be embodied in many different forms and is not limited to the embodiments described herein. Rather, these embodiments are provided so that the understanding of the disclosure of the present disclosure will be more thorough.

It should be understood that when an element is defined as "fixed to" another element, it is either directly on the another element or indirectly on the another element with a mediating element. When an element is considered being "connected" to another element, it is either directly connected to the another element or indirectly connected to the another element with a mediating element.

Unless otherwise specified, all terms (comprising technical and scientific terms) used herein have the same meaning as commonly understood by those skilled in the art to which this disclosure belongs. The terms used herein is for the purpose of describing embodiments only and is not intended to limit the present disclosure. As used herein, the term "and/or" includes any and all combinations of one or more of the associated listed items.

Please refer to FIGS. 1 to 6, there is provided a tea-bruising machine 10 according to one embodiment comprising a rack 100, a tossing cage 200, a rotating door 300, a drive and control mechanism 400 and a locking assembly 500.

In the present embodiment, the rack 100 has a cuboid-shaped frame structure, and both ends and the middle of the rack 100 are provided with a supporting plate 110 having an arc-shaped top end, and the bottom of the rack 100 is provided with universal wheels 120 and brake devices to facilitate the movement, positioning and placement of the entire device. The top of the supporting plate 110 has an arc shape and is mainly used to avoid the tossing cage 200. The supporting plate 110 has three groups, two of which are located at two ends of the rack 100, respectively, and the other group is located in the middle of the rack 100. In other embodiments, the group number of the supporting plate 110 may correspond to the number of annular track 230 on the tossing cage 200.

It can be understood that, in other embodiments, the frame structure of the rack 100 may not be limited to a cuboid shape, and the shape of the supporting plate 110 may not be limited as long as the first transmission rod 430 and the second transmission rod 450 can be conveniently installed and free to rotate. Meanwhile, the bottom of the rack 100 may be provided with legs instead of universal wheels 120 as long as the product is conveniently collected under the rack 100.

In the present embodiment, the tossing cage 200 comprises a cylindrical cage wall 210, two end covers 220 and annular tracks 230.

Two end covers 220 are disposed at both ends of the cylindrical cage wall 210 respectively and seal the cylindrical cage wall 210 to form a receiving chamber for storing materials. The inlet and outlet port is disposed on the cylindrical cage wall 210, and two inlet and outlet port are long strip structure of the same size for loading or discharging. It can be understood that, in other embodiments, one or more inlet and outlet port(s) may be provided as long as the requirements of the inlet and outlet amount can be satisfied. Meanwhile, the opening size of the inlet and outlet port may also be adjusted as needed.

In the present embodiment, the annular tracks 230 are disposed on the tossing cage 200 for coordinating with the drive and control mechanism 400 so that the tossing cage 200 can be driven to rotate by the drive and control mechanism 400. The number of annular track 230 is three, two of which are disposed at both ends of the tossing cage 200, and the other is disposed in the middle of the cylindrical cage wall 210. The tossing cage 200 is clamped on the driving wheel set and the auxiliary wheel set via the annular tracks 230.

In the present embodiment, preferably, the annular track 230 is in a groove structure, and the annular track 230 may be movable on the driving wheel 440 and the auxiliary wheel 460. The side edge of the annular track 230 is provided with a plurality of blocking columns 231 which are disposed at intervals on the annular track 230 to movably clamp the rotating door 300 between the cylindrical cage wall 210 and the blocking column 231. It can be understood that, in other embodiments, the annular track 230 may be just an annular convex structure as long as the annular track 230 can rotate in coordination with the driving wheel 440 and the auxiliary wheel 460. The plurality of blocking columns 231 on the annular track 230 may also be alternatively provided as arc-shaped ribs as long as the moving range of the rotating door 300 can be limited to some extent and the rotating door 300 can be prevented from falling off. In other embodiments, it is not necessary to provide the blocking columns 231 as long as the rotating door 300 and the tossing cage 200 can be locked in different states by the close fitting of the locking assembly 500.

In the present embodiment, the material of the tea-bruising machine 200 can be food grade stainless steel, which is lightweight, robust and durable. It can be understood that, in other embodiments, the number of the annular track 230 may be one, two or more, and may be adjusted according to the requirements such as the weight of the tossing cage 200, supporting strength and the stability of rotation.

In the present embodiment, the rotating door 300 has an arc shape, and the rotating door 300 is disposed on the outside of the cylindrical cage wall 210 for sealing the inlet and outlet port, and the rotating door 300 is provided with a limiting hole 320. There are two rotating doors 300 for sealing the two inlet and outlet ports, respectively. When the number of the inlet and outlet port is changed, the number and setting mode of the rotating door 300 may also be adaptively adjusted. Preferably, the rotating door 300 is further provided with a handle 310 to facilitate manual movement of the rotating door 300. In addition, the material of the rotating door 300 is preferably food grade stainless steel, which is lightweight, robust and durable.

In the present embodiment, the drive and control mechanism 400 comprises a controller 410, a rotation driving device 420, a first transmission rod 430, a driving wheel 440, a second transmission rod 450 and an auxiliary wheel 460.

The controller 410 comprises a housing and a control panel, and the housing is disposed on the rack 100. The control panel comprises a touch display, indicators and buttons. The buttons comprise a start button, a stop button, a loading open button, a loading close button, an unloading open button, an unloading close button and an emergency stop button, which can realize intelligent control as a whole. The controller 410 is electrically connected to the rotation driving device 420 and an electromagnetic switch 510, respectively, which can realize accurate control of the rotation angle and rotation direction of the tossing cage 200.

The rotation driving device 420 can drive the tea-bruising machine 200 to rotate in the first and second hour hand directions. When the first hour hand direction is clockwise direction, the second hour hand direction is counterclockwise direction; when the first hour hand direction is counterclockwise direction, the second hour hand direction is clockwise direction. In the present embodiment, the rotation driving device 420 is preferably a stepper motor to facilitate accurate control of the rotational speed and braking. It can be understood that in other embodiments, the rotation driving device 420 can also be other driving mode.

In the present embodiment, the first transmission rod 430 and the second transmission rod 450 are movably passed through the top of the supporting plates 110, respectively. For example, the first transmission rod 430 and the second transmission rod 450 may be passed through the supporting plates 110 via bearings to prevent the wear of the perforations on the supporting plates 110. There are three driving wheels 440 which are disposed in series on the first transmission rod 430 to form a driving wheel set. There are three auxiliary wheels 460 which are disposed in series on the second transmission rod 460 to form an auxiliary wheel set. The driving wheel 440 is disposed corresponding to the auxiliary wheel 460 and in coordination with the annular tracks 230 on the tossing cage 200 so that the tossing cage 200 can be driven to rotate by the rotation driving device 420, which can improve the rotational stability of the tossing cage 200.

It can be understood that, in other embodiments, the number of the driving wheel 440 in the driving wheel set and the number of the auxiliary wheel 460 in the auxiliary wheel set can be adaptively adjusted as long as they can coordinate with the annular track 230 and ensure the rotational stability of the tossing cage 200.

In the present embodiment, the tossing cage 200 is movably clamped on the driving wheel set and the auxiliary wheel set via the annular track 230 to realize that the tossing cage 200 is driven to rotate by the rotation driving device 420. In other embodiments, the annular track 230 may also coordinate with the driving wheel 440 by the transmission of a pulley to realize that the tossing cage 200 is driven to rotate by the rotation driving device 420. It can be understood that, in other embodiments, in the drive and control mechanism 400, the output shaft of the rotation driving device 420 can also be directly connected to the tossing cage 200 without using the driving wheel 440 and the auxiliary wheel 460, as long as the rotation driving device 420 can drive the tossing cage 200 to rotate and realize accurate control of the rotation angle and rotation direction of the tossing cage 200.

In the present embodiment, the locking assembly 500 comprises an electromagnetic switch 510 and an elastic bead lock 520.

The electromagnetic switch 510 is disposed on the rack 100 via a supporting column 511. The locking column of the electromagnetic switch 510 is used to be inserted into the limiting hole 320 on the rotating door 300 to limit the rotating door 300, so that the tossing cage 200 can rotate independently under the driving of the rotation driving device 420.

The elastic bead lock 520 comprises an elastic lock body 521 and a bead body 522 which are disposed on the tossing cage 200 and the rotating door 300 respectively and coordinate with each other for locking the tossing cage 200 with the rotating door 300.

In the present embodiment, both the elastic lock body 521 and the bead body 522 are formed in an arc structure to be attached on the cylindrical cage wall 210 and the arc-shaped rotating door 300, respectively.

In the present embodiment, the elastic bead lock 520 has two sets, and each set corresponds to the sealing and opening of one inlet and outlet port. Each set of elastic bead locks 520 has two groups, wherein the first group of elastic bead lock comprises a first elastic lock body and a first bead body, and the second group of elastic bead lock comprises a second elastic lock body and a second bead body. The first elastic lock body is disposed on the cylindrical cage wall 210 and located at the edge position of the side contacting with the rotating door 300, and the second elastic lock body is disposed on the cylindrical cage wall 210 and located at the middle position of the cylindrical cage wall 210, and the first bead body and the second bead body are disposed at edge positions of both sides of the rotating door 300, respectively. When the first elastic lock body is locked with the first bead body, the tossing cage 200 and the rotating door 300 coordinate with each other to seal the inlet and outlet port for bruising; when the second elastic lock body is locked with the second bead body, the tossing cage 200 and the rotating door 300 coordinate with each other to expose the inlet and outlet port for loading and unloading.

It can be understood that, in other embodiments, the elastic lock body 521 may comprise an arc-shaped fixing column and two elastic lock body ends which are locked with the first bead body and the second bead body disposed on the tossing cage 200, respectively. The radian of the arc-shaped fixing column is adapted to the radian of the rotating door 300 to fix the elastic lock body 521 to the rotating door 300.

In addition, it can be understood that the setting of the elastic lock body 521 and the bead body 522 on the tossing cage 200 and the rotating door 300 are corresponding. In the present embodiment, the elastic lock body 521 is disposed on the tossing cage 200, and the bead body 522 is disposed on the rotating door 300 and below the handle 310. In other embodiments, when the elastic lock body 521 is disposed on the rotating door 300, the bead body 522 is disposed on the tossing cage 200.

In the present embodiment, the controller 410 can control the locking column of the electromagnetic switch 510 to be inserted into the limiting hole, and can control the rotation driving device 420 to drive the tossing cage 210 to rotate in different directions to lock or unlock the tossing cage 200 with the rotating door 300; after the tossing cage 200 is locked with the rotating door 300, the controller 410 can control the locking column to release from the limiting hole, and can control the rotation driving device 420 to drive the tossing cage 210 to rotate with the rotating door 300 together, to realize the automatic opening and closing of the rotating door 300 and the automatic control of the process of the loading and unloading and the bruising, and improve the production efficiency.

Figure 7:
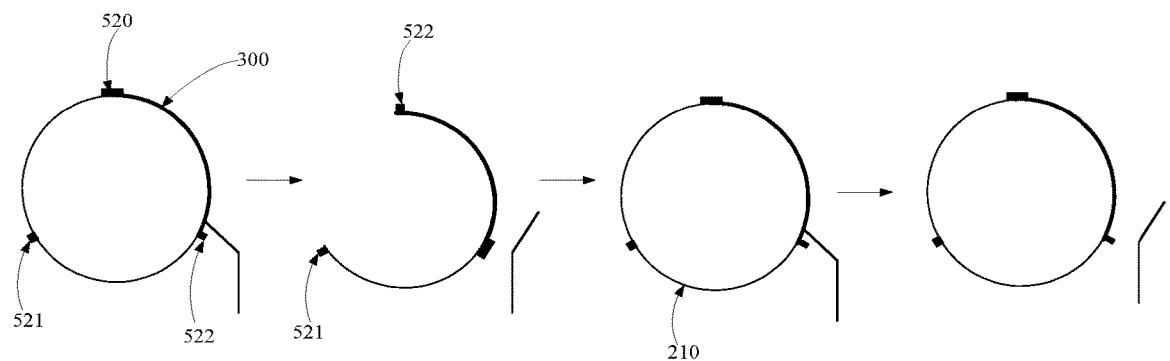
FIG. 7 is a schematic diagram of the process change of loading controlled by the tea-bruising machine in FIG. 1.
Figure 8:
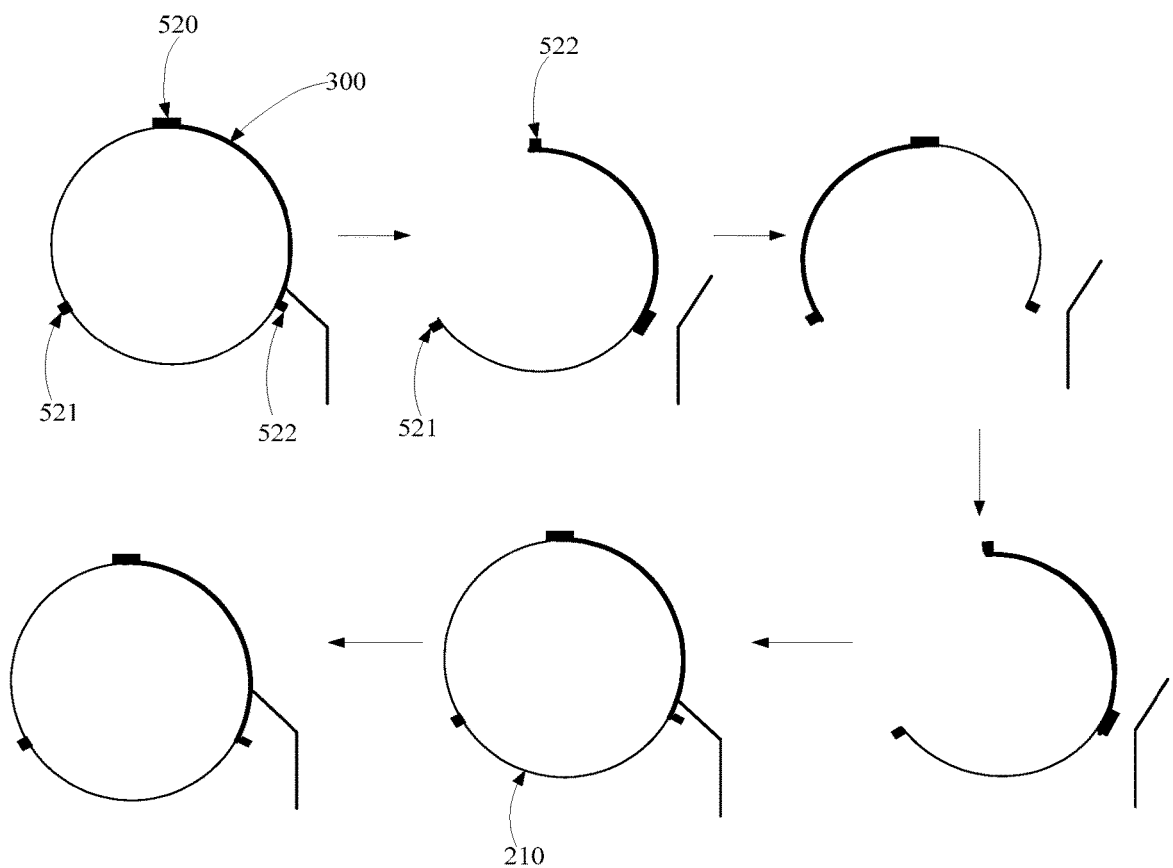
FIG. 8 is a schematic diagram of the process change of unloading controlled by the tea-bruising machine in FIG. 1.

Please further refer to FIG. 7 and FIG. 8, tea bruising is performed by using the tea-bruising machine 10 of the present embodiment, and the method of bruising tea comprises the following steps:

S1: controlling the locking column to be inserted into the limiting hole 320 to limit the rotating door 300 to prevent its movement, and controlling the rotation driving device 420 to rotate and drive the tossing cage 200 to rotate in the first hour hand direction, to unlock the tossing cage 200 and the first side of the rotating door 300 and to expose the inlet and outlet port upwards, and rotating the tossing cage 200 to lock with the second side of the rotating door 300.

S2: loading tea raw materials.

S3: after the loading is finished, controlling the rotation driving device 420 to rotate and drive the tossing cage 200 to rotate in the second hour hand direction until the tossing cage 200 are locked with the first side of the rotating door 300 and the inlet and outlet port is sealed, and controlling the locking column to release from the limiting hole 320, and controlling the rotation driving device 420 to rotate and drive the tossing cage 210 to rotate with the rotating door 300 together to perform bruising.

S4: repeating step S1 after the bruising is finished, and then controlling the rotation driving device 420 to rotate and drive the tossing cage 200 to rotate with the rotating door 300 together in the first hour hand direction until the inlet and outlet port faces downwards to perform unloading.

S5: after the unloading is finished, controlling the rotation driving device 420 to rotate and drive the tossing cage 200 to rotate with the rotating door 300 together in the second hour hand direction until the inlet and outlet port faces upwards, and controlling the locking column to be inserted into the limiting hole 320 to limit the rotating door 300 to prevent its movement, and controlling the rotation driving device 420 to rotate and drive the tossing cage 200 to rotate in the second hour hand direction until the tossing cage 200 are locked with the first side of the rotating door 300 and the inlet and outlet port is sealed.

In the steps of the method of bruising tea by the tea-bruising machine 10 of the present embodiment, when loading and unloading, the tossing cage 200 can be controlled to rotate in the clockwise direction by 120° so that a specific range of exposure of the inlet and outlet port can be realized and the tossing cage 200 is locked with the second side of the rotating door 300. When the loading or unloading is finished, the tossing cage 200 can be controlled to rotate in the counterclockwise direction by 120° to return to the original position so that the tossing cage 200 is locked with the first side of the rotating door 300 to perform bruising. It can be understood that, in other embodiments, the rotation angle of the tossing cage 200 can be adjusted according to the size of the inlet and outlet port or the size of the area of the inlet and outlet port that needs to be exposed.

By using the tea-bruising machine 10 of the present embodiment to shake tea such as oolong tea, the electromagnetic switch 510 can coordinate with the elastic bead lock 520 under the control of the controller 410, thereby, the automatic opening and closing of the rotating door 300, and the automatic control of the process of the loading and unloading and the bruising can be realized, and the production efficiency can be improved. When the tea-bruising machine 10 of the present embodiment is linked with other processing equipment such as loading transport mechanism and receiving transport mechanism, the processing of raw materials such as tea as well as continuity and automation can be realized, and the production efficiency can be further significantly improved as a whole.

The technical features of the above-described embodiments may be combined arbitrarily. To simplify the description, all the possible combinations of the technical features in the above embodiments are not described. However, all of the combinations of these technical features should be considered as within the scope of the disclosure, as long as such combinations do not contradict with each other.

The above-described embodiments merely represent several embodiments of the present disclosure, and the description thereof is more specific and detailed, but it should not be construed as limiting the scope of the present disclosure. It should be noted that, for those skilled in the art, several variations and improvements may be made without departing from the concept of the present disclosure, and these are all within the protection scope of the present disclosure. Therefore, the scope of protection of the present disclosure shall be subject to the appended claims.

The invention claimed is:

1. A tea-bruising machine comprising a rack, a tossing cage, a rotating door, a locking assembly and a drive and control mechanism;
   the rotatable tossing cage is disposed on the rack, and the tossing cage has an inlet and outlet port and a receiving chamber connected with the inlet and outlet port;
   the rotating door is disposed on the outside of the tossing cage, and the rotating door is provided with a limiting hole, and the tossing cage is capable of rotating relative to the rotating door to seal the rotating door or open the inlet and outlet port;
   the locking assembly comprises an elastic bead lock and an electromagnetic switch, the elastic bead lock comprises an elastic lock body and a bead body which are disposed on the tossing cage and the rotating door respectively and coordinate with each other for locking the tossing cage with the rotating door, and the electromagnetic switch has a locking column for inserting into the limiting hole;
   the drive and control mechanism comprises a rotation driving device and a controller, the rotation driving device is connected with the tossing cage for driving the tossing cage to rotate, and the controller is electrically connected with the rotation driving device and the electromagnetic switch, respectively; and
   the controller is capable of controlling insertion of the locking column of the electromagnetic switch into the limiting hole, and of controlling the rotation driving device to drive the tossing cage to rotate in different directions to lock or unlock the tossing cage with the rotating door; after the tossing cage is locked with the rotating door, the controller is capable of controlling the locking column to release from the limiting hole, and of controlling the rotation driving device to drive the tossing cage to rotate with the rotating door together.

2. The tea-bruising machine according to claim 1, wherein, the tossing cage comprises a cylindrical cage wall and two end covers, and the two end covers are respectively disposed at two ends of the cylindrical cage wall and seal the cylindrical cage wall; and the inlet and outlet port is opened on the cylindrical cage wall.

3. The tea-bruising machine according to claim 2, wherein, the elastic bead lock has two groups, wherein the first group of elastic bead lock comprises a first elastic lock body and a first bead body, and the second group of elastic bead lock comprises a second elastic lock body and a second bead body;
   the first elastic lock body is disposed on the cylindrical cage wall and located at an edge position of the side in contact with the rotating door, and the second elastic lock body is disposed on the cylindrical cage wall and located at a middle position of the cylindrical cage wall, and the first bead body and the second bead body are disposed at edge positions of both sides of the rotating door, respectively;
   when the first elastic lock body is locked with the first bead body, the tossing cage and the rotating door coordinate with each other to seal the inlet and outlet port for bruising; when the second elastic lock body is locked with the second bead body, the tossing cage and the rotating door coordinate with each other to expose the inlet and outlet port for loading and unloading materials.

4. The tea-bruising machine according to claim 1, wherein, the tea-bruising machine is provided with an annular track;
   the drive and control mechanism further comprises a driving wheel and an auxiliary wheel, the driving wheel is capable of being driven to rotate by the rotation driving device, and the driving wheel and the auxiliary wheel are movably disposed on the rack;
   the annular track rotates in coordination with the driving wheel and the auxiliary wheel so that the tossing cage can be driven to rotate by the rotation driving device.

5. The tea-bruising machine according to claim 4, wherein, the drive and control mechanism further comprises a first transmission rod and a second transmission rod, the first transmission rod is connected with the rotation driving device, and the first transmission rod and the second transmission rod are movably mounted on the rack, respectively;
   a plurality of the driving wheels which are disposed in series on the first transmission rod to form a driving wheel set, and a plurality of the auxiliary wheels which are disposed in series on the second transmission rod to form an auxiliary wheel set; and
   a plurality of the annular tracks which rotate in coordination with the driving wheel set and the auxiliary wheel set respectively so that the tossing cage can be driven to rotate by the rotation driving device.

6. The tea-bruising machine according to claim 5, wherein, the rack is provided with a plurality of supporting plates, and the first transmission rod and the second transmission rod are passed through the plurality of the supporting plates, respectively.

7. The tea-bruising machine according to claim 4, wherein, the annular track is provided at intervals with a plurality of blocking columns, and the plurality of the blocking columns are located on the outside of the rotating door for movably clamping the rotating door between the tossing cage and the blocking columns.

8. The tea-bruising machine according to claim 1, wherein, the electromagnetic switch is disposed on the rack.

9. The tea-bruising machine according to claim 1, wherein, the rack is provided with a universal wheel and a brake device at the bottom thereof.

10. A method of bruising tea using the tea-bruising machine according to claim 1, the method comprises the following steps:
- S1: controlling the locking column to be inserted into the limiting hole to limit the rotating door to prevent its movement, and controlling the rotation driving device to rotate and driving the tossing cage to rotate in the first hour hand direction, so that the tossing cage and the first side of the rotating door are unlocked and the inlet and outlet port are exposed upwards, and rotating the tossing cage until it is locked with the second side of the rotating door;
- S2: loading tea raw materials;
- S3: after the loading is finished, controlling the rotation driving device to rotate and driving the tossing cage to rotate in the second hour hand direction until the tossing cage are locked with the first side of the rotating door and the inlet and outlet port is sealed, and controlling the locking column to release from the limiting hole, and controlling the rotation driving device to rotate and to drive the tossing cage to rotate with the rotating door together to perform bruising;
- S4: repeating step S1 after the bruising is finished, and then controlling the rotation driving device to rotate and drive the tossing cage to rotate with the rotating door together in the first hour hand direction until the inlet and outlet port face downwards to perform unloading; and
- S5: after the unloading is finished, controlling the rotation driving device to rotate and to drive the tossing cage to rotate with the rotating door together in the second hour hand direction until the inlet and outlet port face upwards, and controlling the locking column to be inserted into the limiting hole to limit the rotating door to prevent its movement, and controlling the rotation driving device to rotate and to drive the tossing cage to rotate in the second hour hand direction until the tossing cage are locked with the first side of the rotating door and the inlet and outlet port are sealed.

* * * * *